(12) United States Patent
Oka

(10) Patent No.: US 10,910,900 B2
(45) Date of Patent: Feb. 2, 2021

(54) COIL FOR ROTARY ELECTRIC MACHINE AND ROTARY ELECTRIC MACHINE WITH IT

(71) Applicant: HONDA MOTOR CO., LTD., Tokyo (JP)

(72) Inventor: Keiichiro Oka, Tochigi (JP)

(73) Assignee: HONDA MOTOR CO., LTD., Tokyo (JP)

(*) Notice: Subject to any disclaimer, the term of this patent is extended or adjusted under 35 U.S.C. 154(b) by 84 days.

(21) Appl. No.: 16/362,905

(22) Filed: Mar. 25, 2019

(65) Prior Publication Data
US 2019/0305622 A1 Oct. 3, 2019

(30) Foreign Application Priority Data

Mar. 30, 2018 (JP) .................................. 2018-067665

(51) Int. Cl.
*H02K 3/28* (2006.01)
*H02K 3/12* (2006.01)

(52) U.S. Cl.
CPC ................. *H02K 3/28* (2013.01); *H02K 3/12* (2013.01)

(58) Field of Classification Search
CPC ......... H02K 3/28; H02K 3/12; H02K 2213/03
USPC .................................................. 310/179, 207
See application file for complete search history.

(56) References Cited

U.S. PATENT DOCUMENTS

2009/0322178 A1* 12/2009 Dobashi ............. H02K 15/0037
310/195
2014/0062230 A1* 3/2014 Mori ................... H02K 15/0081
310/58
2016/0254718 A1* 9/2016 Watanabe ................ H02K 3/12
310/208

FOREIGN PATENT DOCUMENTS

JP 2014-147289 8/2014
JP 2014147289 A * 8/2014
JP 5812145 10/2015

OTHER PUBLICATIONS

Machine translation of JP-2014147289-A. (Year: 2014).*

* cited by examiner

*Primary Examiner* — Michael Andrews
(74) *Attorney, Agent, or Firm* — Rankin, Hill & Clark LLP

(57) ABSTRACT

A coil (3) for a rotary electric machine (3) is constituted by eight layers, and includes an inner coil member (10B) constituting one layer, three layers, five layers, and seven layers, and an outer coil member (10A) constituting two layers, four layers, six layers, and eight layers. An outer upper right arm bending part (31), an outer upper left arm bending part (32), an outer lower right arm bending part (33), and an outer lower left arm bending part (34) of the outer coil member (10A) are formed, at a position where some portions are not overlaid on each other, when six inner coil members (10B) constituting seven layers are arranged to be overlaid on six outer coil members (10A) constituting eight layers.

9 Claims, 17 Drawing Sheets

FIG.10
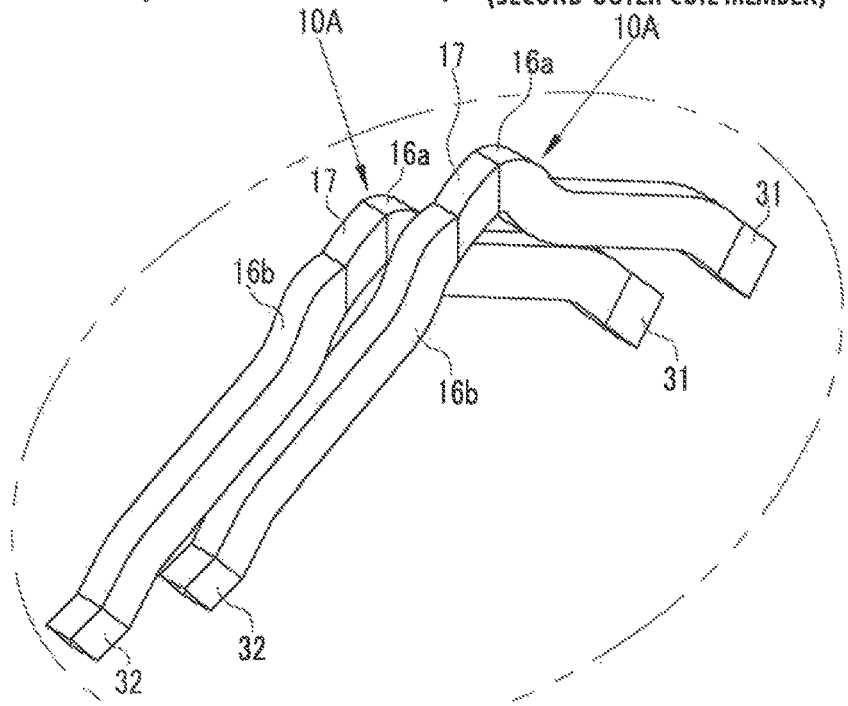
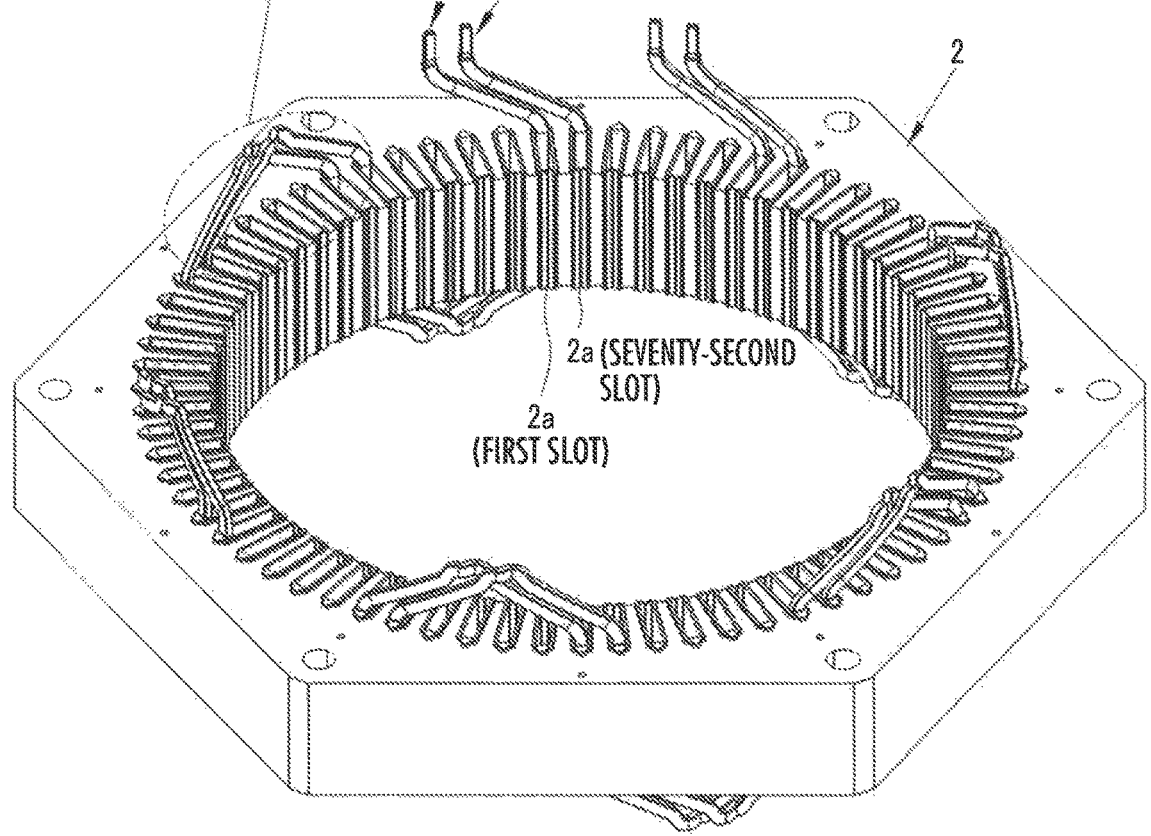

COIL FOR ROTARY ELECTRIC MACHINE AND ROTARY ELECTRIC MACHINE WITH IT

BACKGROUND OF THE INVENTION

Field of the Invention

The present invention relates to a coil for a rotary electric machine, and a rotary electric machine having it.

Description of the Related Art

Conventionally, a coil formed into a cylindrical shape by spirally winding a conductor assembly formed into a belt-like shape by laminating plural conductors molded into a predetermined waveform shape is known as a coil for a rotary electric machine (Japanese Patent No. 5812145).

In Japanese Patent No. 5812145, the plural conductors are formed into such a waveform having a base part (slot housing part) inserted in a slot of a stator core constituting the rotary electric machine, and a connection part (turn part) respectively connecting one end and the other end of adjacent base parts projecting from the slot. Also, in Japanese Patent No. 5812145, a crank part bent in a radial direction of the stator core is formed at a peak part the most away from the stator core of the connection part, and a small crank part with a smaller bending amount than that of the crank part is formed at a joint part of the base part connected to the connection part, so as to prevent interference between the adjacent conductors.

To avoid interference between adjacent small crank parts, for example, there is a need for displacing the small crank parts in an axial line direction of the stator core, so a projection amount of the coil from the stator core becomes large. To avoid it, width of the small crank part is made narrower than that of other portions in Japanese Patent No. 5812145, so there is a need of a processing step, which results in deterioration of costs. Furthermore, the width of the small crank parts is narrower than that of the other portions, so a conductor resistance is deteriorated.

SUMMARY OF THE INVENTION

The present invention is made in light of such a circumstance, and an object of the present invention is to provide a coil for a rotary electric machine, by which the deteriorations of the conductor resistance and costs can be prevented, and a rotary electric machine having it.

The coil for the rotary electric machine according to the present invention is formed into an annular shape by plural coil members, and is inserted in plural slots provided on an annular stator of the rotary electric machine. The plural coil members respectively comprise plural base parts inserted in the slots, extending in an axial line direction of the coil, and having a gap in a circumferential direction of the coil, plural first connection parts projecting from one end of the slot and connecting ends of the adjacent base parts to each other, and plural second connection parts projecting from the other end of the slot and connecting the other ends of the adjacent base parts to each other. The first and second connection parts respectively comprise two arms extending from one end and the other end of each of the adjacent base parts so that they approach to each other, and an arm connection part connecting the two arms. The coil members are arranged in line in the circumferential direction of the coil, and are inserted in the same slot in the radial direction of the coil. The coil members adjacent to each other in the same slot in the radial direction of the coil are phase-offset from each other and thus arranged. In the two arms, an arm bending part bent in the radial direction of the coil is respectively provided at a joint part of the arm, the joint part being positioned not to overlay on the other coil member in the radial direction of the coil. The phase-offset means that the positions of the first connection parts of the coil members adjacent in the same slot in the radial direction of the coil are offset from each other when seen in a side view.

According to the present invention, the arm bending part is bent at a position where it is not overlaid on the other coil member. There is no need of making thickness of the arm bending part thinner than other portions, so deterioration of the conductor resistance can be prevented. Also, there is no need of a processing step, so cost deterioration can be prevented.

Preferably, the arm connection part is bent in the radial direction of the coil.

In this constitution, the coil members adjacent to each other in the circumferential direction of the coil can be arranged without interference.

Preferably, the arm bending part is bent in one of an inner direction and an outer direction in the radial direction of the coil, and the arm connection part is bent in the other of the inner direction and the outer direction in the radial direction of the coil.

In this constitution, the arm bending part is bent in one of the inner direction and the outer direction in the radial direction of the coil, and the arm connection part is bent in the other of the inner direction and the outer direction in the radial direction of the coil, so that the plural coil members can be respectively returned to the same position in the radial direction of the coil.

Preferably, the arm connection part extends in the circumferential direction of the coil.

In this constitution, compared to the arm connection part not extending in the circumferential direction of the coil, the arm connection part can be gradually bent in the radial direction of the coil. Also, compared to the arm connection part sharply bent, a load applied to the arm connection part can be reduced.

Preferably, the arm is bent at an angle of about 45 degrees in the circumferential direction of the coil. About 45 degrees means an angle in a range of 45±5 degrees.

In this constitution, the arm bending part of the arm can be formed in an almost rectangular shape. Furthermore, compared to the arm bent at an angle smaller than 45 degrees (for example, 30 degrees), the arm bending part of the arm can be formed in a wider range, so as to reduce a load applied to the coil.

Preferably, the arm is bent plural times at different angles in the circumferential direction of the coil.

In this constitution, for example, after the arm is bent at a first inclination angle, it can be bent at an inclination angle smaller than the first inclination angle. Thereby, compared to the arm bent at the same inclination angle (for example, first inclination angle), a projection amount of the atm in the axial line direction of the coil can be made small, and a space for the arm bending part can be secured. Preferably, the first inclination angle is 45 degrees.

Preferably, among the plural coil members, the arm bending part of a terminal end of the coil member arranged on the innermost peripheral side in the radial direction of the slot is bent in an outer direction of the radial direction of the coil.

In this constitution, the arm bending part of the terminal end of the coil member can be prevented from contacting a rotor provided inside a stator core.

Preferably, one of the two arms is positioned at a reference position in the radial direction of the coil, and the other is positioned at a projection position at which it projects nearer an inner side than the reference position. Among the two arms, arms positioned at the reference position of the coil members adjacent to each other in the radial direction of the coil are faced to each other, and the other arms positioned at the projection position are faced to each other.

In the coil members adjacent to each other in the radial direction of the coil, when one arm positioned at the reference position is faced to the other arm positioned at the projection arm, one arm of the coil member inside in the radial direction (reference position) interferes with the other arm of the coil member outside in the radial direction (projection position), so the coil member cannot be arranged.

In the coil members adjacent to each other in the radial direction of the coil, when one arm positioned at the reference position is faced to the arm positioned at the projection position, a waste space is generated between one arm of the coil member outside in the radial direction (reference position) and the other arm of the coil member inside in the radial direction (projection position), thereby enlarging the size of the coil.

According to this constitution, in the coil member adjacent to each other in the radial direction of the coil, the arms positioned at the reference position are faced to each other, and the other arms positioned at the projection position are faced to each other. Therefore, the arms do not interfere with each other, and the coil members can be reliably arranged. Also, there is no waste space between the arms faced to each other, so that enlargement of the coil can be prevented.

The rotary electric machine according to the present invention comprises a coil for the rotary electric machine, and a stator that is formed in a cylindrical shape and on the inner periphery of which plural slots in which plural base parts of the coil for the rotary electric machine are inserted, are formed.

By the rotary electric machine according to the present invention, deteriorations of the conductor resistance and costs can be prevented.

BRIEF DESCRIPTION OF THE DRAWINGS

FIG. 10 is a perspective view showing a status that first and second outer coil members are mounted to the stator core;

DETAILED DESCRIPTION OF THE PREFERRED EMBODIMENTS

With reference to drawings, a coil for a rotary electric machine in one embodiment of the present invention will be explained as follows.

Figure 1:
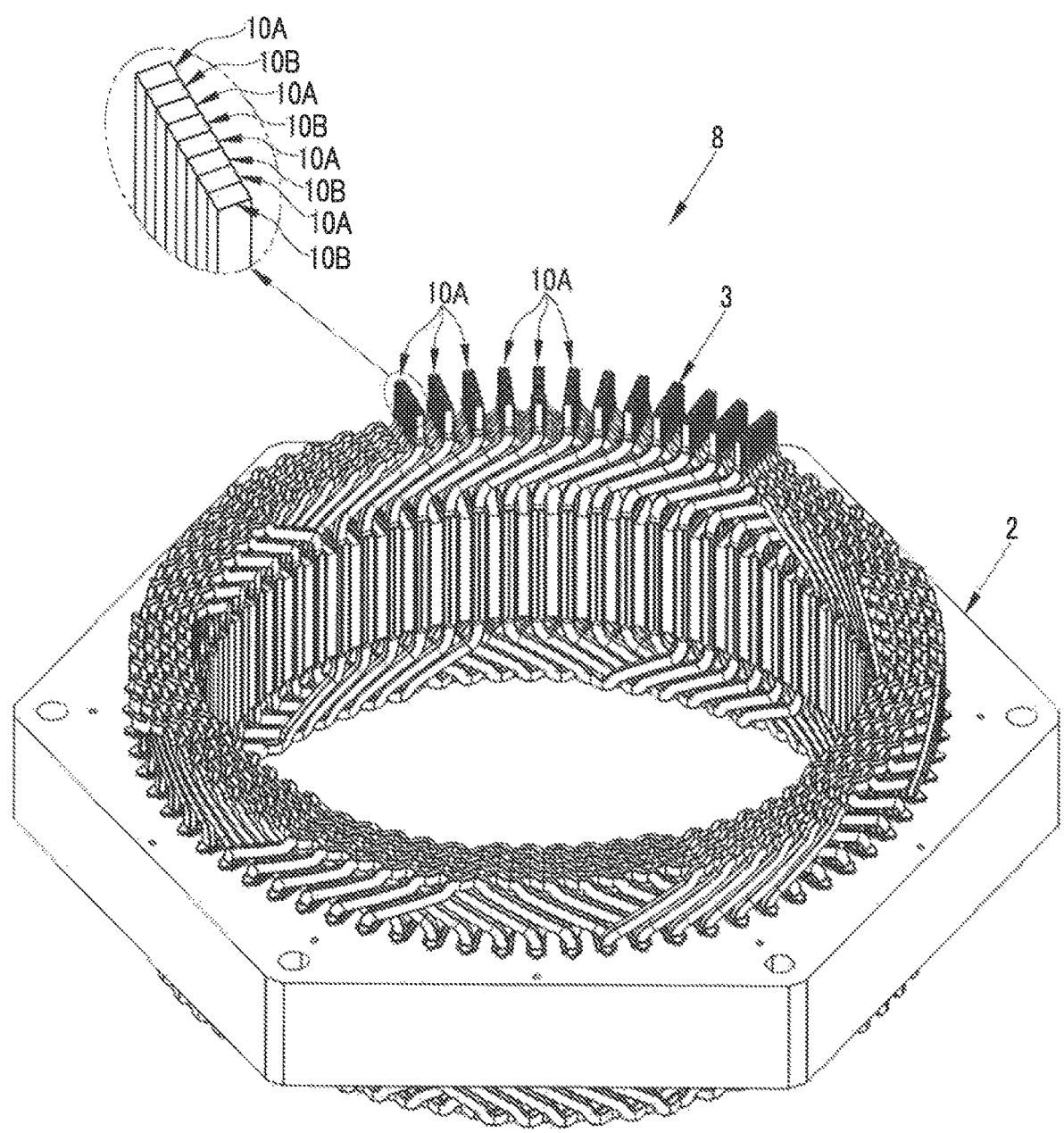
FIG. 1 is a top view showing a coil for a rotary electric machine and a stator to which it is mounted, in one embodiment of the present invention.
Figure 2:
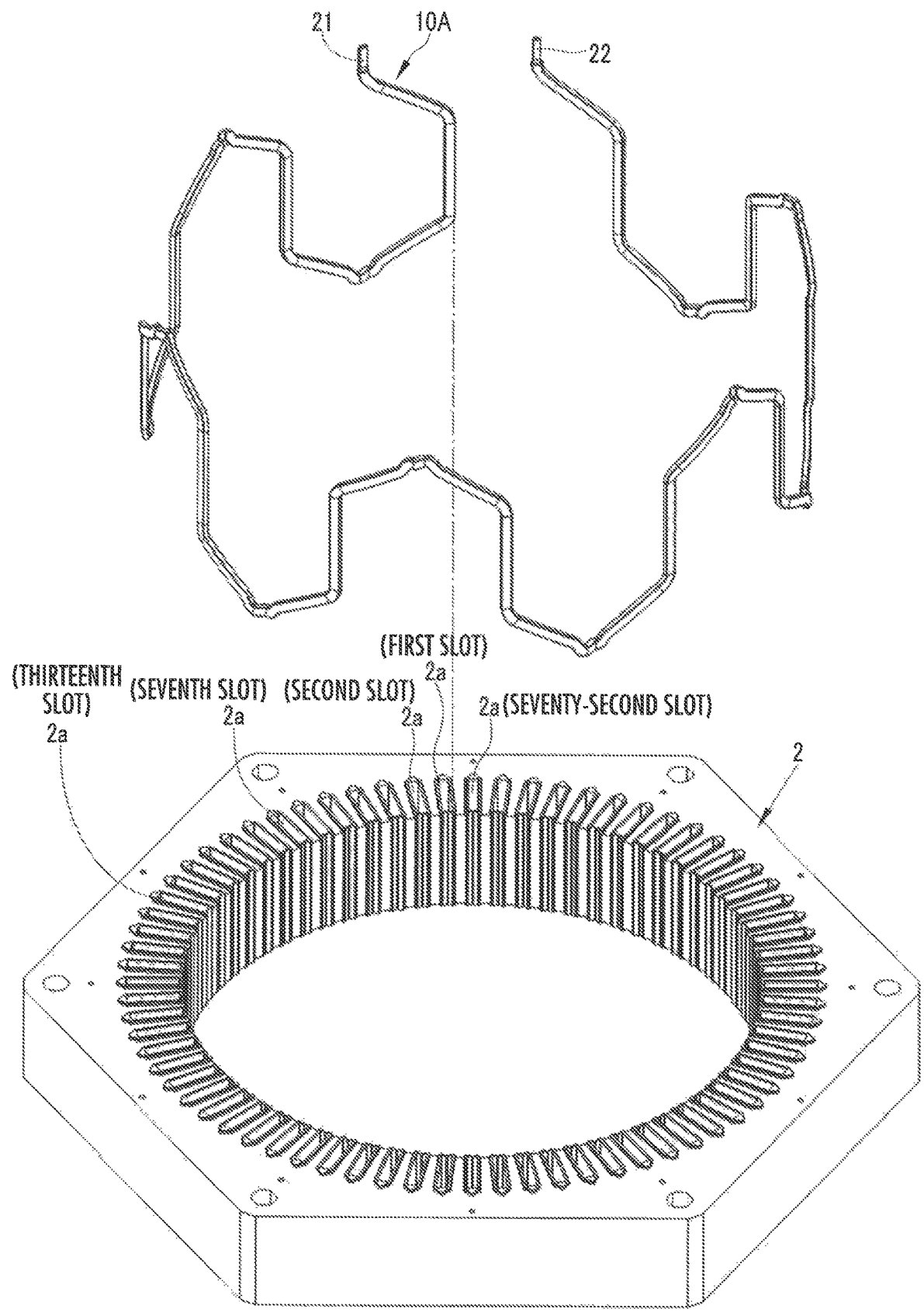
FIG. 2 is an exploded perspective view showing a stator core and an 8-layer outer coil member.

As shown in FIGS. 1 and 2, a rotary electric machine 8 such as an electric motor and a generator comprises a stator 1 formed into a cylindrical shape, and a rotor (not shown) rotatably arranged inside the stator 1.

The stator 1 comprises a stator core 2, and a coil 3 according to the present invention. The stator core 2 has a cylindrical shape, and is provided with plural (for example, in this embodiment, 72) slots 2a penetrating in a rotary axial direction are spaced from each other in a circumferential direction.

In this embodiment, a slot 2a at a predetermined position is referred to as a first slot 2a, and slots are referred to as second, third to 27th slots 2a sequentially in a counterclockwise direction.

The coil 3 comprises an outer coil member 110A and an inner coil member 10B formed at the same thickness. The 24 outer coil members 10A and the 24 inner coil members 10B are respectively provided, and inserted in the slots 2a of the stator core 2. Also, FIGS. 1, 2, 9 to 13 generally show the first outer coil member 10A and the second outer coil member 10A.

The coil 3 is sequentially inserted in an inner coil member 10B, an outer coil member 10A, an inner coil member 10B, an outer coil member 10A, an inner coil member 10B, an outer coil member 110A, an inner coil member 10B, and an outer coil member 10A from inside in the radial direction of the stator core 2, in one slot 2a.

In this embodiment, first to eighth layers are sequentially aligned toward outside from inside in the radial direction of the stator core 2. That is to say, the first, third, fifth and seventh layers are constituted by the inner coil members 110B, and the second, fourth, sixth and eighth layers are constituted by the outer coil members 10A.

The coil 3 comprises six inner coil members 10B in each layer of the first, third, fifth and seventh layers, and so total of 24 inner coil members 10B are therein.

The coil 3 comprises six outer coil members 10A in each layer of the second, fourth, sixth and eighth layers, and so total of 24 outer coil members 10A are therein.

[Outer Coil Member]

Figure 3:
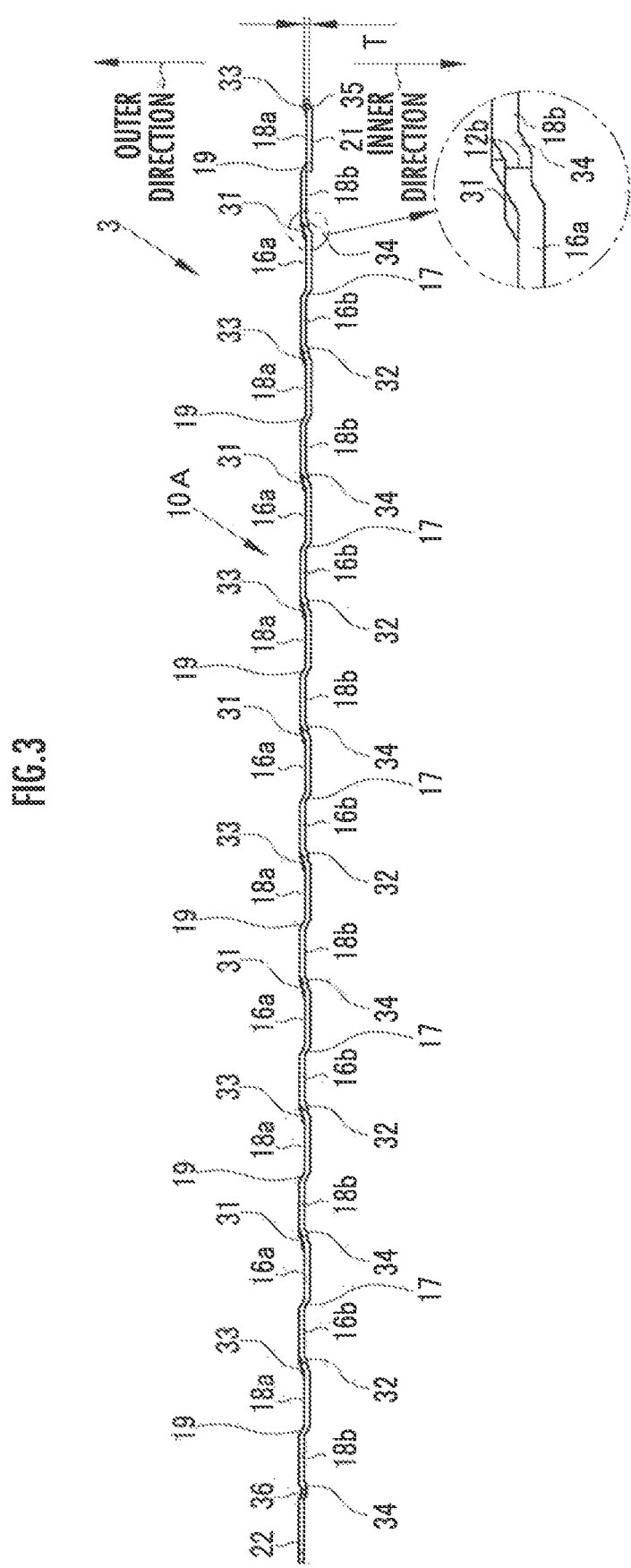
FIG. 3 is a top view of an outer coil member.
Figure 4:
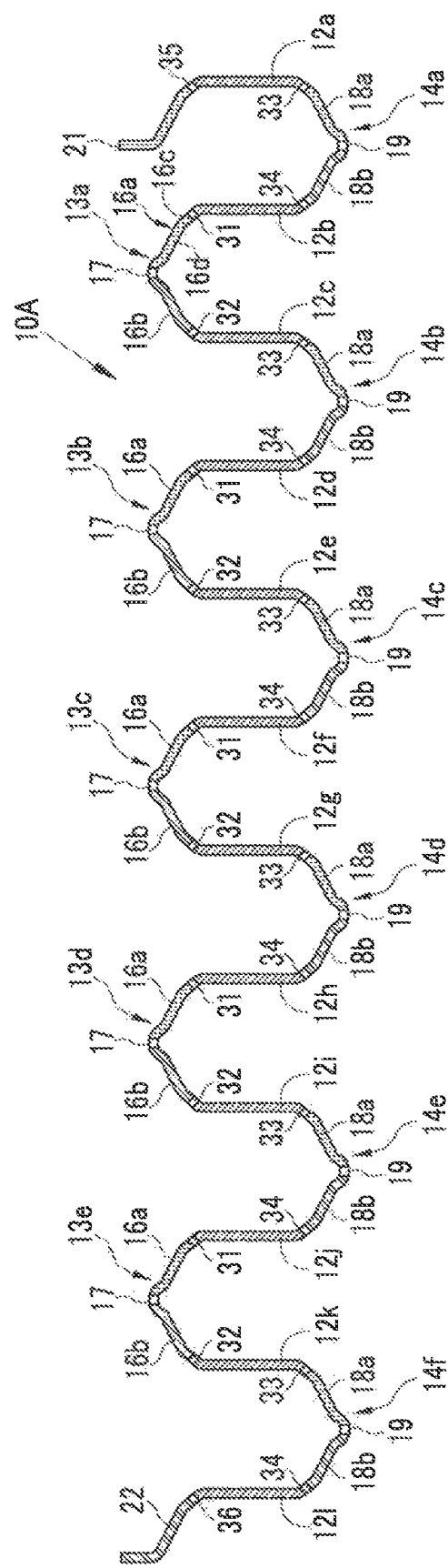
FIG. 4 is a front view of an outer coil member.

As shown in FIGS. 3 and 4, the outer coil member 10A is, for example, a flat angle conductor wire type, and comprises first to twelfth outer base parts 12a to 12l inserted in the slots 2a, and first to fifth outer upper connection parts 13*a* to 13*e* (first connection parts) connecting upper ends (ends) of the first to twelfth outer base parts 12*a* to 12*l* adjacent to each other. Also, the outer coil member 10A comprises first to sixth outer lower connection parts 14*a* to 14*f* (second connection parts) connecting lower ends (other ends) of the first to twelfth outer base parts 12*a* to 12*l* adjacent to each other.

The first outer upper connection part 13*a* connects an upper end of the second outer base part 12*b* to an upper end of the third outer base end part 12*c*. The second outer upper connection part 13*b* connects an upper end of the fourth outer base part 12*d* to the upper end of the fifth outer base part 12*e*. The third outer upper connection part 13*c* connects the upper end of the sixth outer base part 12*f* to the upper end of the seventh outer base part 12*g*.

The fourth outer upper connection part 13*d* connects the upper end of the eighth outer base part 12*h* to the upper end of the ninth outer base part 12*i*. The fifth outer upper connection part 13*e* connects the upper end of the tenth outer base part 12*j* to the upper end of the eleventh outer base part 12*k*.

The first outer lower connection part 14*a* connects the lower end of the first outer base part 12*a* to the lower end of the second outer base part 12*b*. The second outer lower connection part 14*b* connects the lower end of the third outer base part 12*c* to the lower end of the fourth outer base part 12*d*. The third outer lower connection part 14*c* connects the lower end of the fifth outer base part 12*e* to the lower end of the sixth outer base part 12*f*.

The fourth outer lower connection part 14*d* connects the lower end of the seventh outer base part 12*g* to the lower end of the eighth outer base part 12*h*. The fifth outer lower connection part 14*e* connects the lower end of the ninth outer base part 12*i* to the lower end of the tenth outer base part 12*j*. The sixth outer lower connection part 14*f* connects the lower end of the eleventh outer base part 12*k* to the lower end of the twelfth outer base part 12*l*.

The first to fifth outer upper connection parts 13*a* to 13*e* are formed into the same shape, and have outer upper right arms 16*a* and outer upper left arms 16*b*, and an outer upper arm connection part 17 extending in a circumferential direction (a horizontal direction in FIG. 4) of the stator core 2, and connecting the outer upper right 16*a* and the outer upper left arm 16*b*.

The outer upper right arms 16*a* of the first to fifth outer upper connection parts 13*a* to 13*e* are respectively connected to the second, fourth, sixth, eighth and tenth outer base parts 12*b*, 12*d*, 12*f*, 12*h* and 12*j*. The outer upper left arms 16*b* of the first to fifth outer upper connection parts 13*a* to 13*e* are respectively connected to the third, fifth, seventh, ninth and eleventh outer base parts 12*c*, 12*e*, 12*g*, 12*i* and 12*k*.

The outer upper right arms 16*a* and the outer upper left arms 16*b* of the first to fifth outer upper connection parts 13*a* to 13*e* respectively extend in a manner to approach to each other, while being bent in the circumferential direction (the horizontal direction of FIG. 4) of the stator core 2.

The outer upper right arms 16*a* of the first to fifth outer upper connection parts 13*a* to 13*e* have respective first outer inclination parts 16*c* which are respectively connected to the second, fourth, sixth, eighth and tenth outer base parts 12*b*, 12*d*, 12*f*, 12*h* and 12*j* and whose inclination angle (angle in the horizontal direction) is at a first predetermined angle (for example, 45 degrees). Also, the respective outer upper right arms 16*a* have respective second outer inclination parts 16*d* which are connected to the respective first outer inclination parts 16*c* and whose inclination a is smaller than the first predetermined angle (for example, 28 degrees). The respective outer upper left arms 16*b* of the first to fifth outer upper connection parts 13*a* to 13*e* are formed horizontally symmetrically to the respective outer upper right arms 16*a* of the first to fifth outer upper connection parts 13*a* to 13*e*.

First to sixth outer lower connection parts 14*a* to 14*f* are formed into the same shape, and comprise outer lower right arras 18*a* and outer lower left arms 18*b*, and outer lower arm connection parts 19 extending in the circumferential direction (the horizontal direction in FIG. 4) of the stator core 2, and connecting the outer lower right arms 18*a* and the outer lower left arms 18*b*.

The outer lower right arms 18*a* and the outer lower left arms 18*b* of the first to sixth outer lower connection parts 14*a* to 14*f* are connected to the first to twelfth outer base parts 12*a* to 12*l*, and extend in a manner to approach to each other while being bent in the circumferential direction (the horizontal direction in FIG. 4) of the stator core 2, respectively. The outer lower right arms 18*a* and the outer lower left arms 18*b* of the first to sixth outer lower connection parts 14*a* to 14*f* are respectively formed vertically symmetrical to the outer upper fight arms 16*a* and the outer upper left arms 16*b* of the first to fifth outer upper connection parts 13*a* to 13*e*.

An outer right end 21 bent in the circumferential direction (the horizontal direction in FIG. 3) of the stator core 2 and then extending upward is connected to an upper end of the first outer base part 12*a*. An outer left end 22 bent in the circumferential direction (the horizontal direction in FIG. 4) of the stator core 2 and then extending upward is connected to an upper end of the twelfth outer base part 12*l*.

The outer coil member 10A is bent in the radial direction (the vertical direction in FIG. 3) of the stator core 2, and divides a position of the outer coil member 10A in the radial direction of the stator core 2 into three positions. In this embodiment, in FIG. 4, three positions are shown by three kinds of different hatching patterns.

The outer upper left arms 16*b*, the outer lower left arms 18*b* and the outer left ends 22 are located at a reference position of the outer coil member 10A indented to an outermost side in the radial direction of the stator core 2. The respective parts 16*b*, 18*b*, 22 are shown by hatching patterns of lines extending from a lower left side to an upper right side.

The first to twelfth outer base parts 12*a* to 12*l* are located to a 0.5 T projecting position projecting by 0.51 (T is thickness of the outer coil member 10A in the radial direction of the stator core 2) from the reference position in the radial direction of the stator core 2. The first to twelfth outer base parts 12*a* to 12*l* at the 0.5 T projecting position are shown by hatching patterns of lines extending from an upper left side to a lower right side.

The outer upper fight arms 16*a*, the outer lower right arms 18*a* and the outer right ends 21 are located at a 1 T projecting position of the outer coil member 10A projecting to an inner side by 1 T from the reference position in the radial direction of the stator core 2. The respective parts 16*a*, 18*a* and 21 at the 1 T projecting position reference position are shown by hatching pattern of lines extending upward and downward.

Outer upper right arm bending parts 31 bent to an outer side by 0.5 T in the radial direction of the stator core 2 are formed on the outer upper right arms 16*a* at joint portions connected to the second, fourth, sixth, eight and tenth outer base parts 12*b*, 12*d*, 12*f*, 12*h* and 12*j*.

Outer upper left arm bending parts 32 bent to an inner side by 0.5 T in the radial direction of the stator core 2 are formed on the outer upper left arms 16*b* at joint portions connected to the third, fifth, seventh, ninth and eleventh outer base parts 12c, 12e, 12g, 12i and 12k.

An outer upper arm connection part 17 is bent to an outer side by 1 T in the radial direction of the stator core 2, from a right end (1 T projecting position) connected to the outer upper right arm 16a to a left end (reference position) connected to the outer upper left arm 16b.

Outer lower right arm bending parts 33 bent to an outer side by 0.5 T in the radial direction of the stator core 2 are formed on the outer lower right arms 18a at joint portions connected to the first, third, fifth, seventh, ninth and eleventh base parts 12a, 12c, 12e, 12g, 12i and 12k.

Outer lower left arm bending parts 34 bent to an inner side by 0.51 T in the radial direction of the stator core 2 are formed on the outer lower left arms 18b at joint portions connected to the second, fourth, sixth, eighth, tenth and twelfth base parts 12b, 12d, 12f, 12h, 12j and 12l.

An outer lower arm connection part 19 is bent to an outer side by 1 T in the radial direction of the stator core 2 from a right end (1 T projecting position) connected to the outer lower right arm 18a to a left end (reference position) connected to the outer lower left arm 18b.

A right end bending part 35 bent to an outer side by 0.5 T in the radial direction of the stator core 2 is formed on an outer tight end 21 at a portion connected to the first outer base part 12a.

A left end bending part 36 bent to an inner side by 0.5 T in the radial direction of the stator core 2 is formed on an outer left end 22 at a portion connected to the twelfth outer base part 12l.

[Inner Coil Member]

Figure 5:
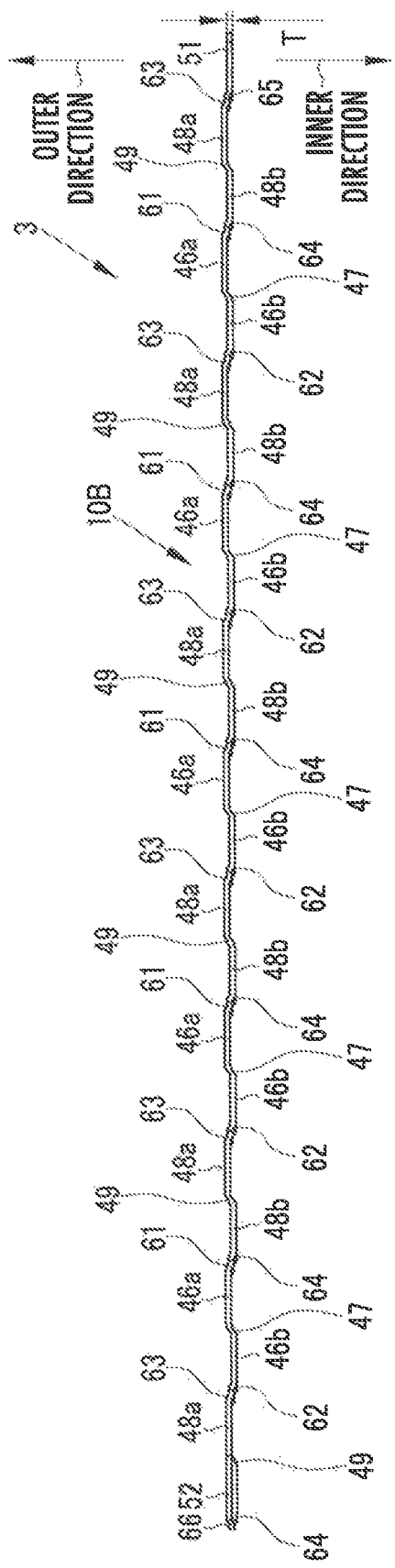
FIG. 5 is a top view of an inner coil member.
Figure 6:
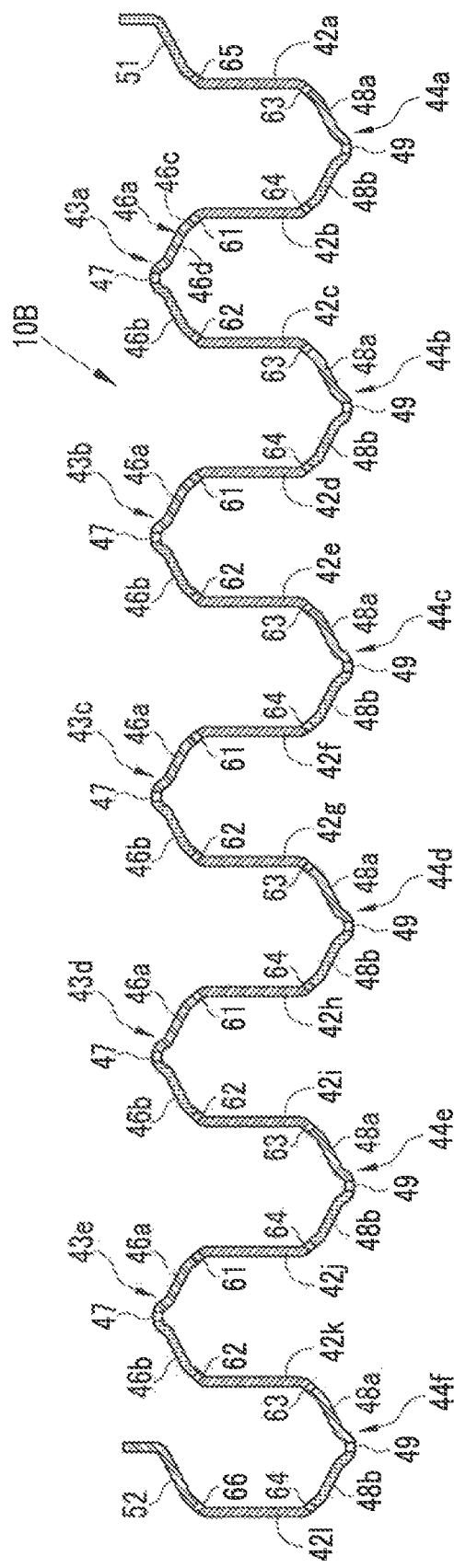
FIG. 6 is a front view of an inner coil member.

As shown in FIGS. 5 and 6, an inner coil member 10B is of a flat-angle conductor type, and is formed into a shape horizontally symmetrical to an outer coil member 10A. Detailed explanation thereof will be simplified.

The inner coil member 10B comprises first to twelfth inner base parts 42a to 42l inserted in the slots 2a, and first to fifth inner upper connection parts 43a to 43e connecting upper ends (ends) of the first to twelfth inner base parts 42a to 42l adjacent to each other. Also, the inner coil member 10B comprises first to sixth inner lower connection parts 44a to 44f connecting lower ends (other ends) of the first to twelfth inner base parts 42a to 42l adjacent to each other.

The first to fifth inner upper connection parts 43a to 43e are formed into the same shape, and comprise inner upper right arms 46a, inner upper left arms 46b, and inner upper arm connection parts 47.

The inner upper right arm 46a comprises a first inner inclination part 46c, and a second inner inclination part 46d. The inner upper left arm 46b is formed horizontally symmetrical to the inner upper right arm 46a.

The first to sixth lower connection parts 44a to 44f are formed into the same shape, and comprise inner lower right arms 48a, inner lower left arms 48b, and inner lower arm connection parts 49.

An inner right end 51 is connected to an upper end of the first inner base part 42a. An inner left end 52 is connected to an upper end of the twelfth inner base part 42l.

The inner upper right arms 46a, the inner lower right arms 48a and the inner left ends 52 are located at a reference position of the inner coil member 10B indented to an outermost side in the radial direction of the stator core 2. The respective parts 46a, 48a, 52 at the reference position are shown by hatching patterns of lines extending from a lower left side to an upper right side.

The first to twelfth inner base parts 42a to 42l are located to a 0.5 T projecting position projecting to an inner side by 0.5 T (T is thickness of the inner coil member 10B in the radial direction of the stator core 2) from the reference position in the radial direction of the stator core 2. The first to twelfth inner base parts 42a to 42l at the 0.5 T projecting position are shown by hatching patterns of lines extending from an upper left side to a lower right side.

The inner upper left arms 46b, the inner lower left arms 48b and the inner right ends 51 are located at a 1 T projecting position projecting to an inner side by 1 T from the reference position in the radial direction of the stator core 2. The respective parts 46b, 48b and 52 at the 1 T projecting position reference position are shown by hatching pattern of lines extending upward and downward.

Inner upper right arm bending parts 61 bent to an inner side by 0.5 T in the radial direction of the stator core 2 are formed on the inner upper right arms 46a at joint portions connected to the second, fourth, sixth, eight and tenth inner base parts 42b, 42d, 42f, 42h and 42j.

Inner upper left arm bending part 62 bent to an outer side by 0.5 T in the radial direction of the stator core 2 are formed on the inner upper left arms 46b at joint portions connected to the third, fifth, seventh, ninth and eleventh inner base parts 42c, 42e, 42g, 42i and 42k.

An inner upper arm connection part 47 is bent to an inner side by 1 T in the radial direction of the stator core 2, from a right end (reference position) connected to the inner upper right arm 46a to a left end (1 T projecting position) connected to the inner upper left arm 46b.

Inner lower right arm bending parts 63 bent to an inner side by 0.5 T in the radial direction of the stator core 2 are formed on the inner lower right arms 48a at joint portions connected to the first, third, fifth, seventh, ninth and eleventh inner base parts 42a, 42c, 42e, 42g, 42i and 42k.

Inner lower left arm bending parts 64 bent to an outer side by 0.5 T in the radial direction of the stator core 2 are formed on the inner lower left arms 48b at joint portions connected to the second, fourth, sixth, eighth, tenth and twelfth inner base parts 42b, 42d, 42f, 42h, 42j and 42l.

An inner lower arm connection part 49 is bent to an inner side by 1 T in the radial direction of the stator core 2 from a right end (reference position) connected to the inner lower right arm 48a to a left end (1 T projecting position) connected to the inner lower left arm 48b.

An inner right end bending part 65 bent to an outer side by 0.5 R in the radial direction of the stator core 2 is formed on an inner right end 51 at a portion connected to the first inner base part 42a.

An inner left end bending part 66 bent to an inner side by 0.5 T in the radial direction of the stator core 2 is formed on an inner left end 52 at a portion connected to the twelfth inner base part 42l.

Figure 7:
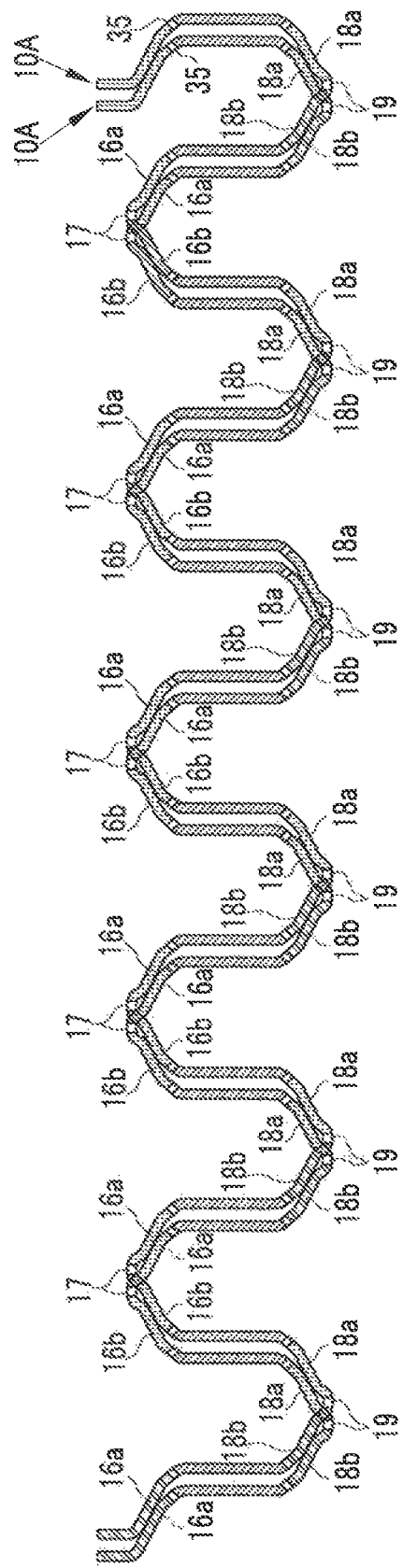
FIG. 7 is a front view showing a status that two outer coil members are aligned.

As shown in FIG. 7, when two outer coil members 10A are aligned in the circumferential direction of the stator core 2, the outer lower left arm 18b of the right outer coil member 10A and the outer lower right 18a of the left outer coil member 10A are overlaid on each other, and the outer upper left arm 16b of the right outer coil member 10A and the outer upper right arm 16a of the left outer coil member 110A are overlaid on each other. Also, at portions of FIGS. 7, 8, 14 to 16 where the coil members are overlaid on each other, overlaid deep side portions are also illustrated by solid lines.

The outer coil member 10A is bent as described above, the outer lower left arm 18b is positioned at the reference position, and the outer lower right arm 18a is positioned at the 1 T projecting position. Accordingly, the outer lower left arm 18b of the right outer coil member 10A and the outer lower right arm 18a of the left outer coil member 10A are in contact with each other without any gap, but are arranged without interfering with each other.

Similarly, the outer upper left arm 16*b* is positioned at a reference position, and the outer upper right arm 16*a* is positioned at the 1 T projecting position. Accordingly, the outer upper left arm 16*b* of the right outer coil member 10A and the outer upper right arm 16*a* of the left outer coil member 10A are in contact with each other without any gap, but are arranged without interfering with each other.

Figure 8:
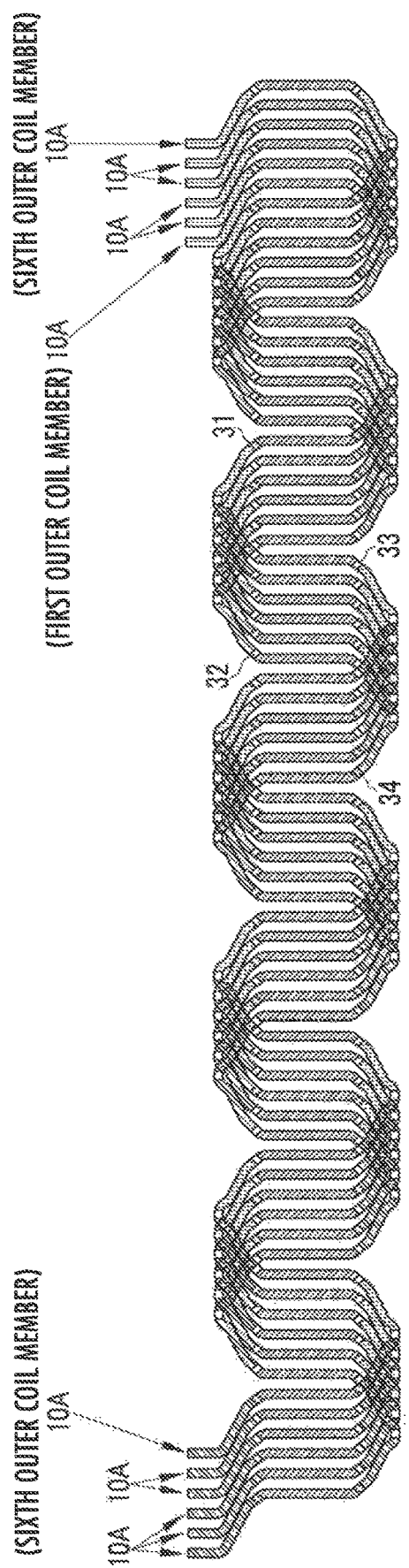
FIG. 8 is a front view showing a status that six outer coil members are aligned.

In this manner, the outer coil members 10A adjacent to each other in the circumferential direction of the stator core 2 do not interfere with each other, and therefore, as shown in FIG. 8, six outer coil members 10A can be arranged in line in the circumferential direction of the stator core 2. In this embodiment, among the six outer coil members 10A, the outer coil member 10A at the left end is referred to as a first outer coil member 10A, and the other outer coil members 10A are referred to as second, third to sixth outer coil members 10A sequentially in a right direction (a clockwise direction in the circumferential direction of the stator core 2).

Similarly, the inner coil members 10B adjacent to each other in the circumferential direction of the stator core 2 do not interfere with each other, and therefore, six inner coil members 10B can be arranged in line in the circumferential direction of the stator core 2. In this embodiment, among the six inner coil members 10B, the inner coil member 10B at the left end is referred to as a first inner coil member 10B, and the other inner coil members 10B are referred to as second, third to sixth inner coil members 10B sequentially in a right direction (a clockwise direction in the circumferential direction of the stator core 2).

Figure 9:
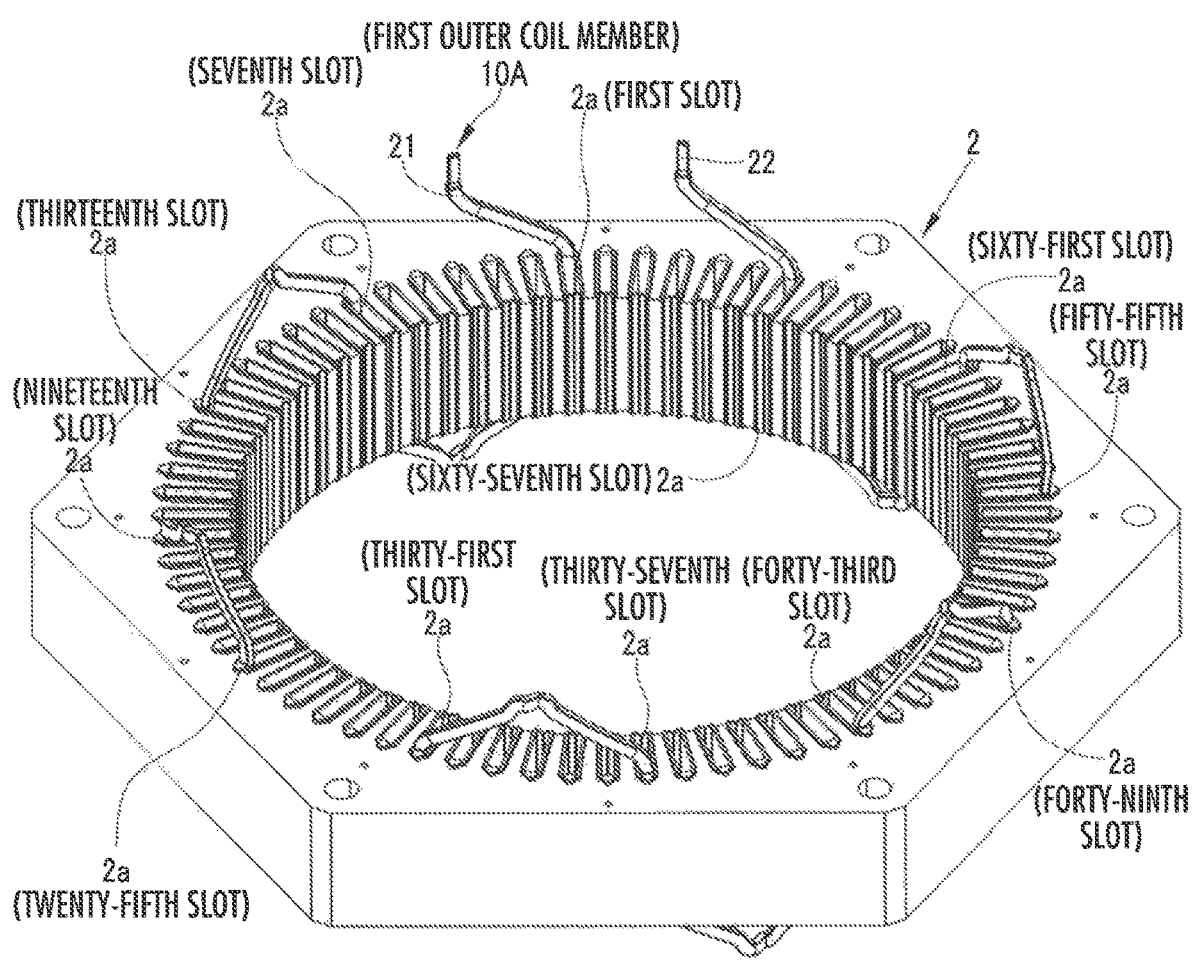
FIG. 9 is a perspective view showing a status that a first outer coil member is mounted to a stator core.

As shown in FIG. 9, when the first to sixth outer coil members 10A are aligned in the circumferential direction of the stator core 2 to constitute eight layers of the coil 3, the first to twelfth outer base parts 12*a* to 12*l* of the first outer coil member 10A are inserted in the first, seventh, thirteenth, nineteenth, twenty-fifth, thirty-first, thirty-seventh, forty-third, forty-ninth, fifty-fifth, sixty-first and sixty-seventh slots 2*a* of the stator core 2.

As shown in FIG. 10, the first to twelfth outer base parts 12*a* to 12*l* of the second outer coil member 10A are inserted in the seventy-second, sixth, twelfth, eighteenth, twenty-fourth, thirtieth, thirty-sixth, forty-second, forty-eighth, fifty-fourth, sixtieth, and sixty-sixth slots 2*a* of the stator core 2.

Figure 11:
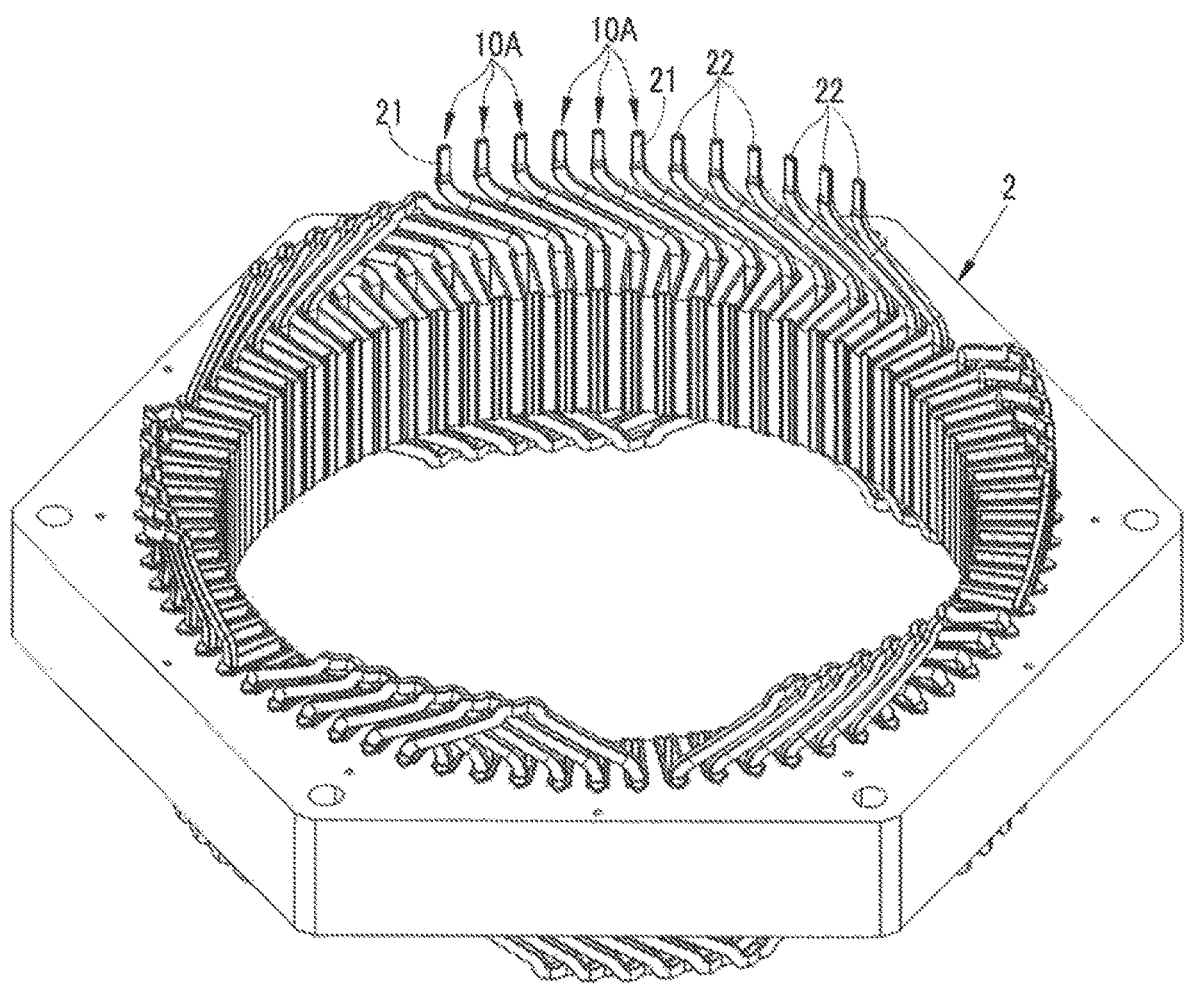
FIG. 11 is a perspective view showing a status that first to sixth outer coil members are mounted to the stator core.

As shown in FIG. 11, similarly to the first and second outer coil members 10A, the first to twelfth outer base parts 12*a* to 12*l* of the third to sixth outer coil members 10A are inserted in the slots 2*a* of the stator core 2. Thereby, eight layers of the coil 3 are constituted.

In detail, the first to twelfth outer base parts 12*a* to 12*l* of the third outer coil member 10A are inserted in the seventy-first, fifth, eleventh, seventeenth, twenty-third, twenty-ninth, thirty-fifth, forty-first, forty-seventh, fifty-third, fifty-ninth, and sixty-fifth slots 2*a* of the stator core 2.

The first to twelfth outer base parts 12*a* to 12*l* of the fourth outer coil member 10A are inserted in the seventieth, fourth, tenth, sixteenth, twenty-second, twenty-eighth, thirty-fourth, fortieth, forty-sixth, fifty-second, fifty-eighth and sixty-fourth slots 2*a* of the stator core 2.

The first to twelfth outer base parts 12*a* to 12*l* of the fifth outer coil member 10A are inserted in the sixty-ninth, third, ninth, fifteenth, twenty-first, twenty-seventh, thirty-third, thirty-ninth, forty-fifth, fifty-first, fifty-seventh and sixty-third slots 2*a* of the stator core 2.

The first to twelfth outer base parts 12*a* to 12*l* of the sixth outer coil member 10A are inserted in the sixty-eighth, second, eighth, fourteenth, twentieth, twenty-sixth, thirty-second, thirty-eighth, forty-fourth, fiftieth, fifty-sixth, and sixty-second slots 2*a* of the stator core 2.

Figure 12:
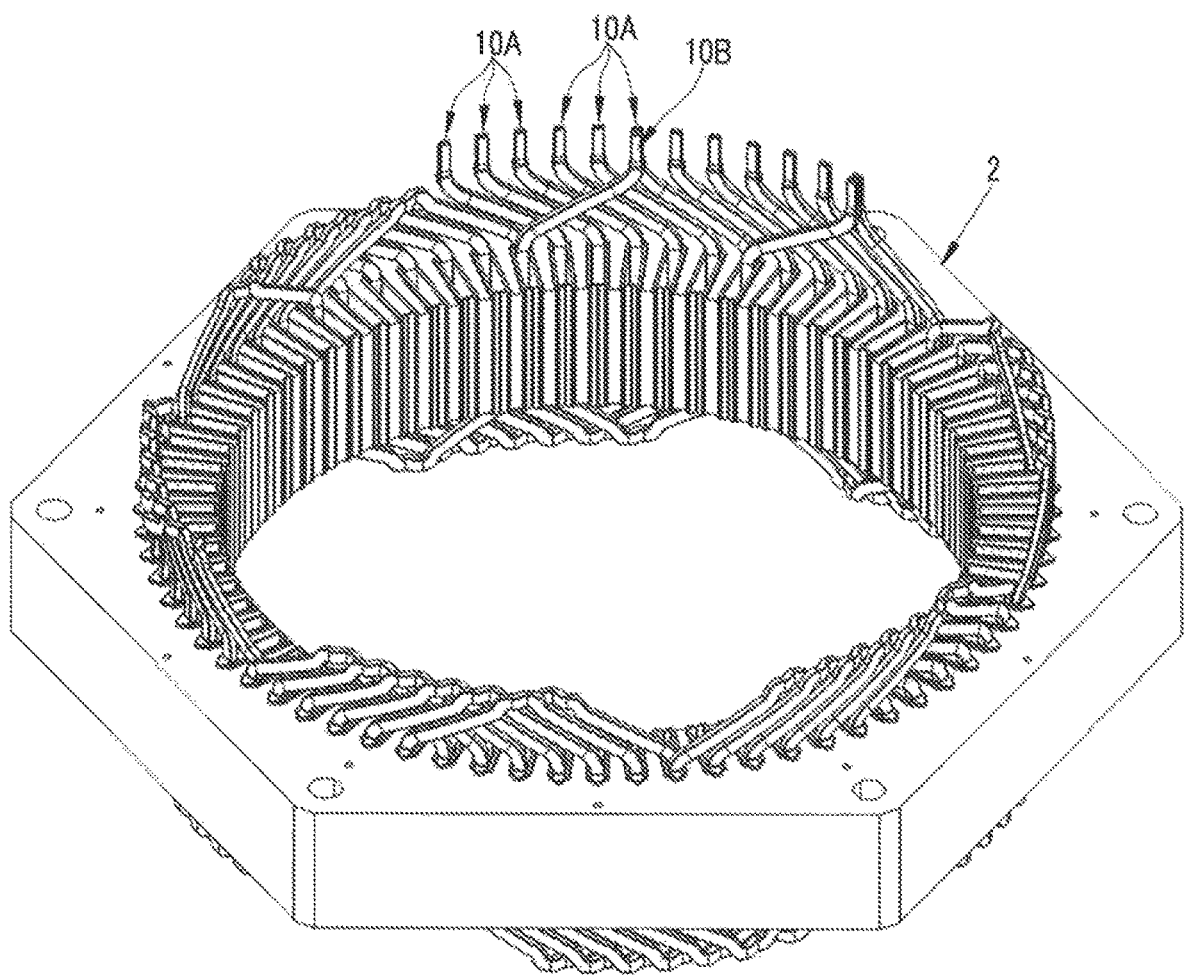
FIG. 12 is a perspective view showing a status that the first to sixth outer coil members and a first inner coil member are mounted to the stator core.

When the first to sixth inner coil members 110B are aligned in the circumferential direction of the stator core 2 to constituted seven layers of the coil 3, as shown in FIG. 12, the first to twelfth inner base parts 42*a* to 42*l* of the sixth inner coil member 10B are inserted in the second, eighth, fourteenth, twentieth, twenty-sixth, thirty-second, thirty-eighth, forty-fourth, fiftieth, fifty-sixth, sixty-second, and sixty-eighth slots 2*a*.

Figure 13:
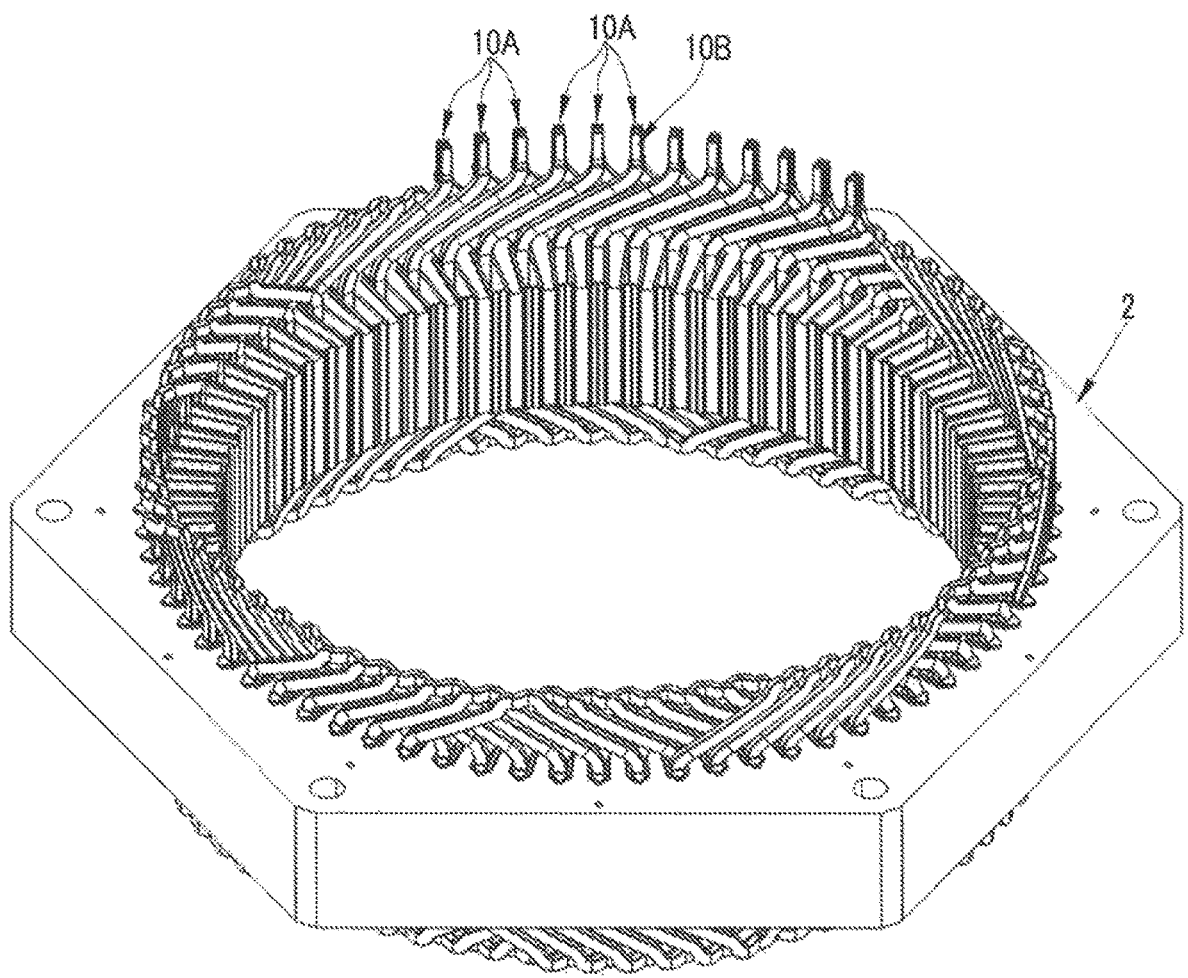
FIG. 13 is a perspective view showing a status that the first to sixth outer coil members and first to sixth inner coil members are mounted to the stator core.

As shown in FIG. 13, similarly to the sixth inner coil member 10B, the first to twelfth outer base parts 12*a* to 12*l* of the fifth to first inner coil members 10B are inserted in the slots 2*a* of the stator core 2. Thereby, seven layers of the coil 3 are constituted.

In detail, the first to twelfth inner base parts 42*a* to 42*l* of the fifth inner coil member 10B are inserted in the third, ninth, fifteenth, twenty-first, twenty-seventh, thirty-third, thirty-ninth, forty-fifth, fifty-first, fifty-seventh, sixty-third, and sixty-ninth slots 2*a*.

The first to twelfth inner base parts 42*a* to 42*l* of the fourth inner coil member 10B are inserted in the fourth, tenth, sixteenth, twenty-second, twenty-eighth, thirty-fourth, fortieth, forty-sixth, fifty-second, fifty-eighth, sixty-fourth, and seventieth slots 2*a*.

The first to twelfth inner base parts 42*a* to 42*l* of the third inner coil member 10B are inserted in the fifth, eleventh, seventeenth, twenty-third, twenty-ninth, thirty-fifth, forty-first, forty-seventh, fifty-third, fifty-ninth, sixty-fifth, and seventy-first slots 2*a*.

The first to twelfth inner base parts 42*a* to 42*l* of the second inner coil member 10B are inserted in the sixth, twelfth, eighteenth, twenty-fourth, thirtieth, thirty-sixth, forty-second, forty-eighth, fifty-fourth, sixtieth, sixty-sixth, and seventy-second slots 2*a*.

The first to twelfth inner base parts 42*a* to 42*l* of the first inner coil member 10B are inserted in the seventh, thirteenth, nineteenth, twenty-fifth, thirty-first, thirty-seventh, forty-third, forty-ninth, fifty-fifth, sixty-first, sixty-seventh, and first slots 2*a*.

Figure 14:
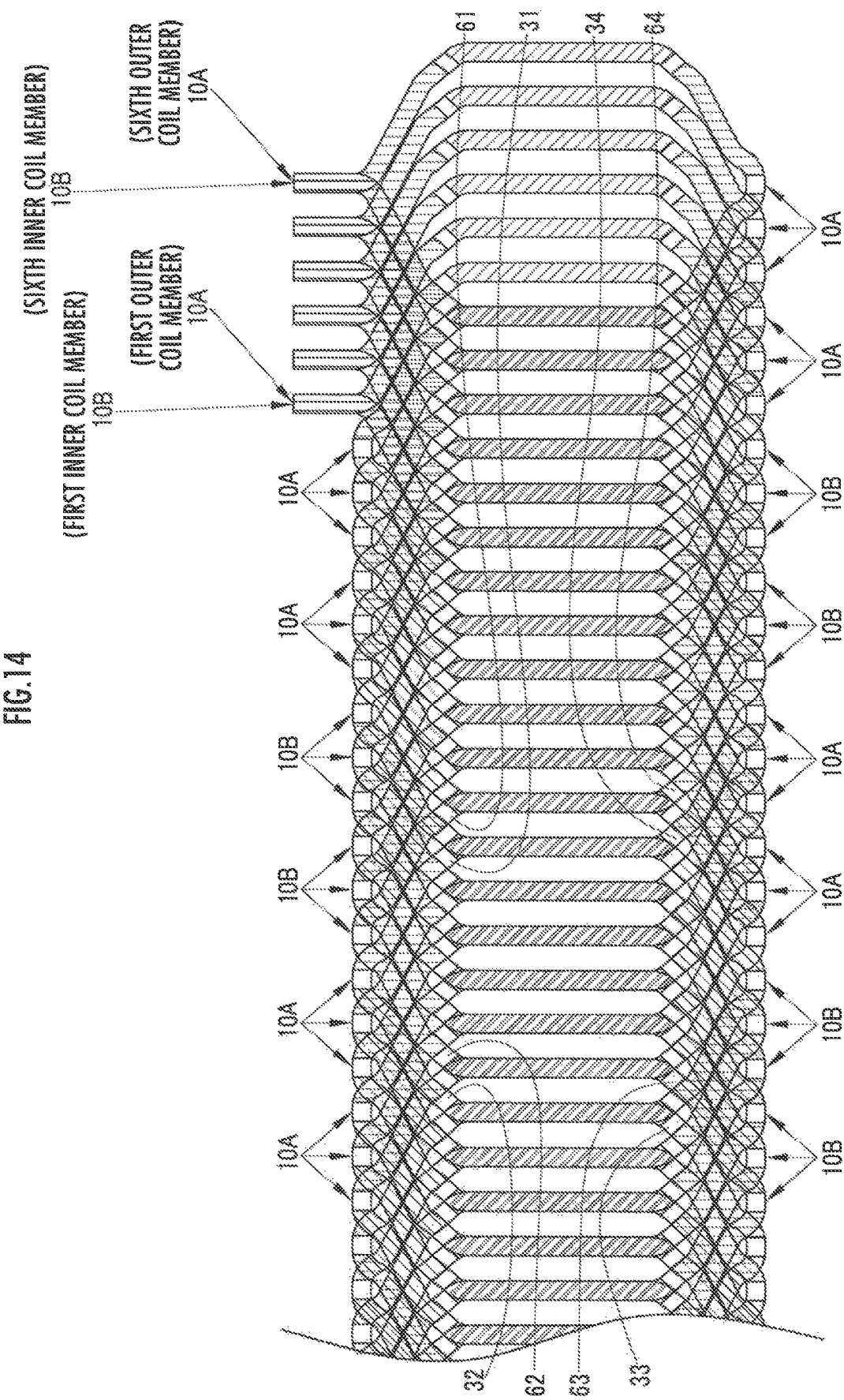
FIG. 14 is a front view showing a status that the first to sixth outer coil members are overlaid on the first to sixth inner coil members.

As shown in FIG. 14, when the first to sixth inner coil members 10B constituting seven layers are arranged to be overlaid on the first to sixth outer coil members 10A constituting eight layers, some portions are not overlaid on each other. At this non-overlaying position, an outer upper right arm bending part 31, an outer upper left arm bending part 32, an outer lower right arm bending part 33, and an outer lower left arm bending part 34 of the outer coil member 10A are formed. Thereby, there is no need of changing thickness (width) of the outer coil member 10A, and there is no need of a processing step of changing thickness of the outer coil member 10A. Therefore, deterioration of the conductor resistance at the respective bending parts 31 to 34 and deterioration of costs can be prevented. The non-overlaying position is a position at which the outer coil members 10A and the inner coil members 10B are not overlaid on each other, when the first to eighth layers of the coil 3 are constituted.

When there is no non-overlaying position, there is a need of displacing the bending part in the axial line direction of the stator core 2, so length in the axial line direction of the coil 3 becomes long. In this embodiment, there is no need of displacing the outer upper right arm bending part 31, the outer upper left arm bending part 32, the lower right arm bending part 33 and the lower left arm bending part 34 in the axial line direction of the stator core 2, and therefore, the length in the axial line direction of the coil 3 can be prevented from being longer.

Similarly, at a position where the first to sixth outer coil members 10A constituting eight layers are not overlaid on the first to sixth inner coil members 10B constituting seven layers, the inner upper right arm bending part 61, the inner upper left arm bending part 62, the inner lower right arm bending part 63, and the inner lower left arm bending part 64 of the inner coil member 10B are formed. Thereby, there is no need of changing thickness (width) of the inner coil member 10B, and there is no need of a processing step of changing thickness of the inner coil member 10B. Therefore, deterioration of the conductor resistance at the respective bending parts 61 to 64 and deterioration of costs can be prevented.

Figure 15:
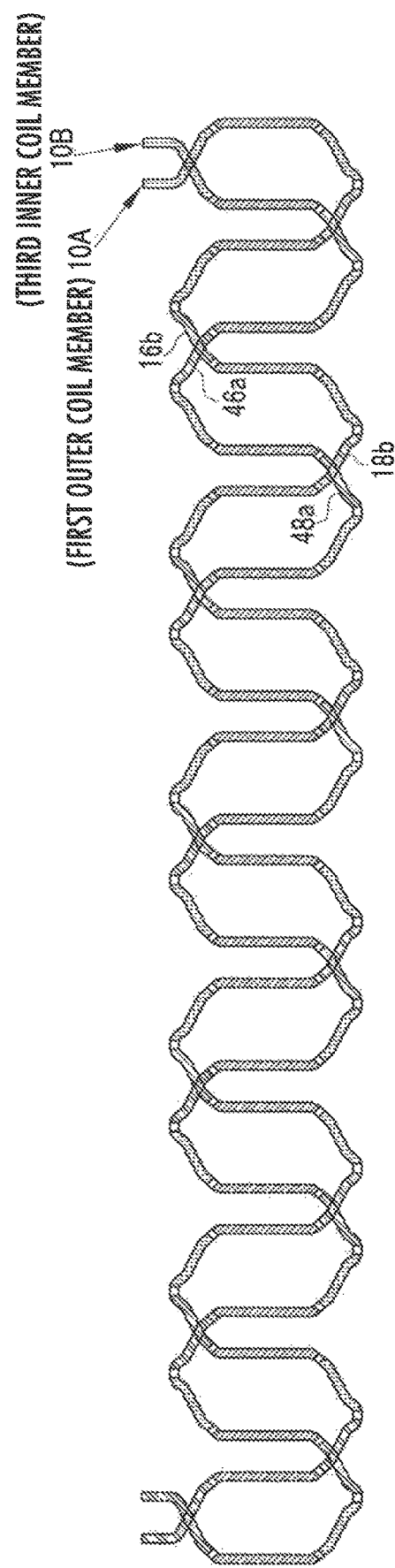
FIG. 15 is a front view showing a status that the first outer coil member is overlaid on the third inner coil member.
Figure 16:
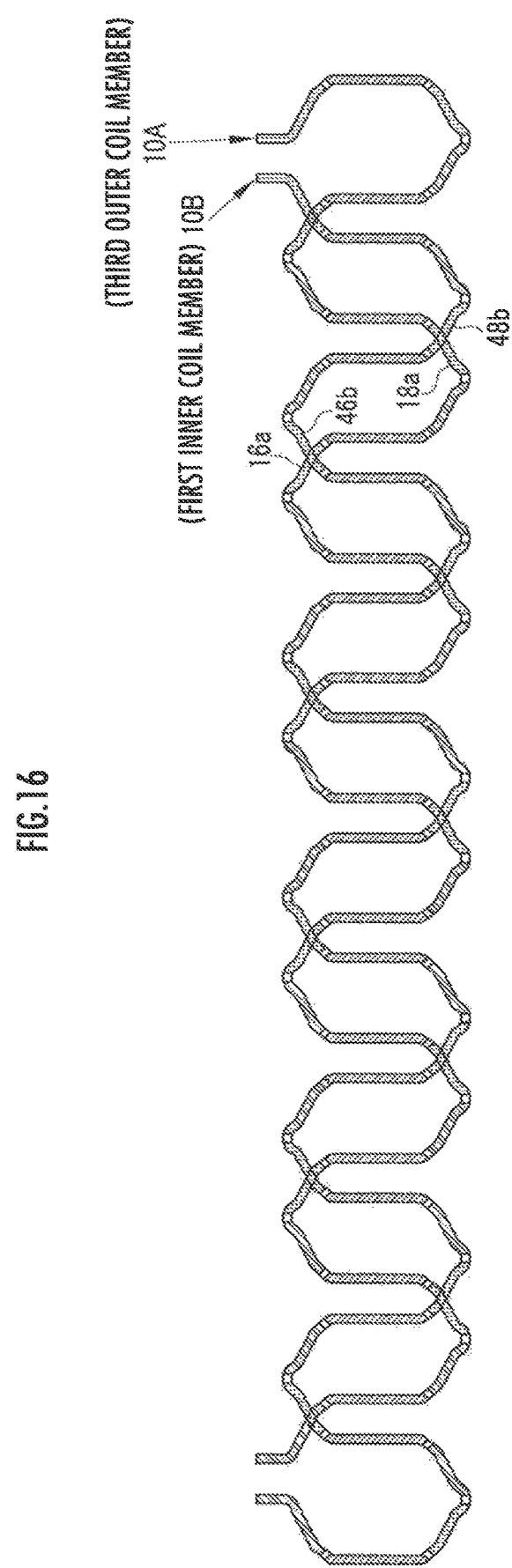
FIG. 16 is a front view showing a status that the third outer coil member is overlaid on the first inner coil member.

FIG. 15 shows a status that the third left end inner coil member 10B is overlaid on the first outer coil member 10A. FIG. 16 shows a status that the first inner coil member 10B is overlaid on the third outer coil member 10A.

As shown in FIG. 15, when the inner coil member 10B constituting seven layers are overlaid on the outer coil member 10A constituting eight layers, the outer upper left arm 16b (reference position) of the outer coil member 10A constituting the eight layers is opposed to the inner upper right arm 46a (reference position) of the inner coil member 10B constituting the seven layers. Also, the outer lower left arm 18b (reference position) of the outer coil member 10A constituting the eight layers is opposed to the inner lower right arm 48a (reference position) of the inner coil member 10B constituting the seven layers.

As shown in FIG. 16, the outer upper right arm 16a (1 T projecting position) of the outer coil member 10A constituting the eight layers is opposed to the inner upper left arm 46b (1 T projecting position) of the inner coil member 10B constituting the seven layers. Also, the outer lower right arm 18a (1 T projecting position) of the outer coil member 10A of the eight layers is opposed to the inner lower left arm 48b (1 T projecting position) of the inner coil member 10B of the seven layers.

In this manner, the outer coil member 10A constituting the eight layers of the coil 3, and the inner coil member 10B constituting the seven layers of the coil 3 are opposed to each other at the same position (such as reference position, 1 T projecting position), and so they can be overlaid on each other without interfering with each other.

In this embodiment, the inner right ends 51 and the inner left ends 52 of the six inner coil members 10B constituting one layer of the coil 3 are bent outward in the radial direction of the stator core 2. Thereby, the six inner coil members 10B constituting one layer of the coil 3 can be prevented from contacting a rotor rotatably arranged inside the stator 1.

In the above-mentioned embodiment, the coil 3 is constituted by an 8-layer coil member, but may be constituted by a plural-layer coil member.

The outer coil member 10A may have such a shape that it is inverted with a center in the horizontal direction in FIG. 3, and the inner coil member 10B may have such a shape that it is inverted with a center in the horizontal direction in FIG. 5. In this case, the outer upper right arm 16a, the outer lower right arm 18a, and the outer right end 21 are at the reference position, and the outer upper left arm 16b, the outer lower left arm 18b, and the outer left end 22 are at the 1 T projecting position.

In the above-mentioned embodiment, the outer upper left arm bending part 32 of the outer coil member 10A has an almost rectangular shape (two-dot lines in FIG. 18). This is because an angle A1 is about 90 degrees.

Figure 17:
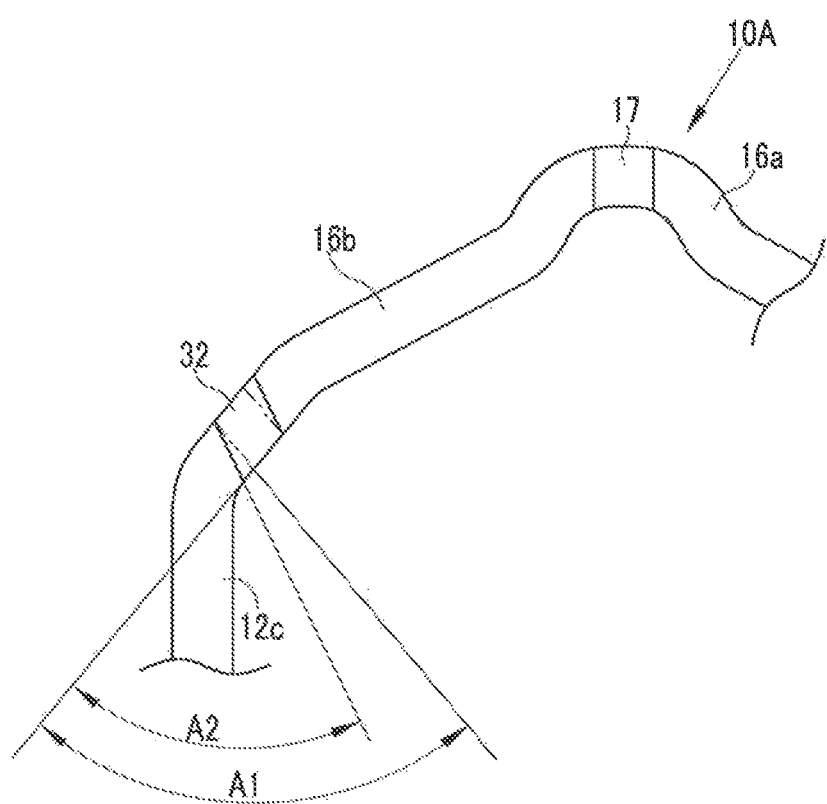
FIG. 17 is a front view showing an enlarged outer coil member in a second embodiment.

The outer upper left arm bending part 32 is not limited to an almost rectangular shape as described above, and may be formed in a parallelogram shape as shown in solid lines of FIG. 17. In this case, an angle A2 is made to be about 70 degrees, so that the outer upper left arm bending part 32 can be formed into a parallelogram shape. The outer upper left arm bending part 32 is formed into a parallelogram shape, so that, when compared to the bending part formed into an almost rectangular shape, the length of the outer upper left arm bending part 32 (length of upper and lower faces of the outer upper left arm bending part 32) can be made long, and a load applied to the outer coil member 10A in bending the outer upper left arm bending part 32 can be reduced.

As is similar to the outer upper left arm bending part 32, the outer upper right arm bending part 31, the outer lower right arm bending part 33, the outer lower left arm bending part 34, the inner upper right arm bending part 61, the inner upper left arm bending part 62, the inner lower right arm bending part 63, and the inner lower left arm bending part 64 may be formed into a parallelogram shape.

What is claimed is:

1. A coil for a rotary electric machine that is formed into an annular shape by plural coil members, and that is inserted in plural slots formed on an annular stator of the rotary electric machine,
   wherein the plural coil members respectively comprise plural base parts inserted in the slots, extending in an axial line direction of the coil, and having a gap in a circumferential direction of the coil, plural first connection parts projecting from one end of the slots and connecting ends of adjacent base parts to each other, and plural second connection parts projecting from the other end of the slots and connecting the other ends of the adjacent base parts to each other,
   wherein the first and second connection parts respectively comprise two arms extending from one end and the other end of each of the adjacent base parts so that they approach to each other, and an arm connection part connecting the two arms,
   wherein the coil members are arranged in line in the circumferential direction of the coil, and are inserted in a same slot in a radial direction of the coil, and the coil members adjacent to each other in the same slot in the radial direction of the coil are phase-offset from each other and thus arranged, and
   wherein in each of the two arms, an arm bending part bent in the radial direction of the coil is provided at a joint part of the arm, the joint part being positioned not to overlap, in the radial direction of the coil, the other coil member adjacent in the radial direction of the coil.

2. The coil for the rotary electric machine according to claim 1, wherein the arm connection part is bent in the radial direction of the coil.

3. The coil for the rotary electric machine according to claim 2,
   wherein the arm bending part is bent in one of an inner direction and an outer direction in the radial direction of the coil, and
   wherein the arm connection part is bent in the other of the inner direction and the outer direction in the radial direction of the coil.

4. The coil for the rotary electric machine according to claim 2, wherein the arm connection part extends in the circumferential direction of the coil.

5. The coil for the rotary electric machine according to claim 1, wherein the two arms are bent at an angle of about 45 degrees in the circumferential direction of the coil.

6. The coil for the rotary electric machine according to claim 1, wherein the two arms are bent plural times at different angles in the circumferential direction of the coil.

7. The coil for the rotary electric machine according to claim 1, wherein among the plural coil members, the arm bending part of a terminal end of the coil member arranged on an innermost peripheral side in the radial direction of the slot is bent in an outer direction of the radial direction of the coil.

8. The coil for the rotary electric machine according to claim 1,
- wherein one of the two arms is positioned at a reference position in the radial direction of the coil, and the other is positioned at a projection position at which it projects nearer an inner side than the reference position, and
- wherein among the two arms, arms positioned at the reference position of the coil members adjacent to each other in the radial direction of the coil are faced to each other, and the other arms positioned at the projection position are faced to each other.

9. A rotary electric machine comprising a coil for the rotary electric machine that is formed into an annular shape by plural coil members, and a stator that is formed in a cylindrical shape and on an inner periphery of which plural slots in which plural base parts of the coil for the rotary electric machine are inserted, are formed,
- wherein the plural coil members respectively comprise the plural base parts inserted in the plural slots, extending in an axial line direction of the coil, and having a gap in a circumferential direction of the coil, plural first connection parts projecting from one end of the plural slots and connecting ends of adjacent base parts to each other, and plural second connection parts projecting from the other end of the plural slots and connecting the other ends of the adjacent base parts to each other,
- wherein the first and second connection parts respectively comprise two arms extending from one end and the other end of each of the adjacent base parts so that they approach to each other, and an arm connection part connecting the two arms,
- wherein the coil members are arranged in line in the circumferential direction of the coil, and are inserted in a same slot in a radial direction of the coil, and the coil members adjacent to each other in the same slot in the radial direction of the coil are phase-offset from each other and thus arranged, and
- wherein in each of the two arms, an arm bending part bent in the radial direction of the coil is provided at a joint part of the arm, the joint part being positioned not to overlap, in the radial direction of the coil, the other coil member adjacent in the radial direction of the coil.

* * * * *